United States Patent
Fox et al.

(10) Patent No.: US 7,196,878 B2
(45) Date of Patent: Mar. 27, 2007

(54) SELF-PINNED SPIN VALVE SENSOR WITH STRESS MODIFICATION LAYERS FOR REDUCING THE LIKELIHOOD OF AMPLITUDE FLIP

(75) Inventors: Ciaran Avram Fox, Sunnyvale, CA (US); Hardayal Singh Gill, Palo Alto, CA (US); Prakash Kasiraj, San Jose, CA (US); Wen-Yaung Lee, San Jose, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 481 days.

(21) Appl. No.: 10/788,727

(22) Filed: Feb. 27, 2004

(65) Prior Publication Data
US 2005/0190509 A1    Sep. 1, 2005

(51) Int. Cl.
*G11B 5/39* (2006.01)
(52) U.S. Cl. .................................. 360/324.11
(58) Field of Classification Search ........... 360/324.11, 360/324.1
See application file for complete search history.

(56) References Cited
U.S. PATENT DOCUMENTS 5,583,725 A    12/1996    Coffey et al.
6,295,187 B1 *    9/2001    Pinarbasi ............... 306/324.11
6,548,114 B2    4/2003    Mao et al.
2005/0180057 A1 *    8/2005    Freitag et al. ........... 360/324.1

OTHER PUBLICATIONS

Fakuzawa, et al. Saturation magnetostriction of an ultrathin CoFe free-layer on double-layered underlayers, *Journal of Applied Physics*, Mar. 1, 2002, pp. 3120-3124, 91, 5.

* cited by examiner

*Primary Examiner*—Julie Anne Watko
(74) *Attorney, Agent, or Firm*—John J. Oskorep, Esq.; Matthew Zises, Esq.

(57) ABSTRACT

A spin valve (SV) sensor of the self-pinned type includes one or more compressive stress modification layers for reducing the likelihood that the pinning field will flip its direction. The spin valve sensor includes a capping layer formed over a spin valve structure which includes a free layer, an antiparallel (AP) self-pinned layer structure, and a spacer layer in between the free layer and the AP self-pinned layer structure. A compressive stress modification layer is formed above or below the capping layer, adjacent the AP self-pinned layer structure, or both. Preferably, the compressive stress modification layer is made of ruthenium (Ru) or other suitable material.

31 Claims, 8 Drawing Sheets

FIG. 9
(ABS)

SELF-PINNED SPIN VALVE SENSOR WITH STRESS MODIFICATION LAYERS FOR REDUCING THE LIKELIHOOD OF AMPLITUDE FLIP

BACKGROUND OF THE INVENTION

1. Field of the Invention

This invention relates generally to spin valve sensors of magnetic heads, and more particularly to the utilization of one or more stress modification layers in a spin valve sensor of the self-pinned type for reducing the likelihood that the pinning field will flip its direction.

2. Description of the Related Art

Computers often include auxiliary memory storage devices having media on which data can be written and from which data can be read for later use. A direct access storage device (e.g. a disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (AFM) pinning layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other ferromagnetic layer, referred to as the free layer, however, is not fixed and is free to rotate in response to the field from the information recorded on the magnetic medium (the signal field).

The pinned layer may be part of an antiparallel (AP) pinned layer structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer. In a self-pinned spin valve sensor, however, the first AP pinned layer is not pinned by the AFM layer but is rather "self-pinned". A spin valve sensor of this type relies on magnetostriction of the AP self-pinned layer structure and the air bearing surface (ABS) stress for a self-pinning effect. An AFM pinning layer, which is typically as thick as 150 Angstroms, is no longer necessary for pinning so that a relatively thin sensor can be advantageously fabricated.

There are several characteristics of a spin valve sensor which, if improved, will improve the performance of the magnetic head and increase the data storage capacity of a disk drive. It is generally desirable to increase the magnetoresistive coefficient Ar/R of any spin valve sensor without having to substantially increase its thickness. An increase in this spin valve effect (i.e. Ar/R) equates to higher bit density (bits/square-inch of the rotating magnetic disk) read by the read head. Utilizing a self-pinned structure in a spin valve sensor achieves higher bit densities with its thinner profile and increased sensitivity.

One of the key challenges for self-pinned spin valves, however, has been to improve the pinning field against "flipping". Readback signals from the disk are detected as either a "0" or "1" depending on the polarity of the bits recorded on the disk. However, when an undesirable head-to-disk interaction occurs (due to defects, asperities, bumps, etc.), the sensor experiences compressive or tensile stress which causes the pinning field to flip its orientation. The pinning field may flip its direction either permanently or semi-permanently depending on the severity of the stress. This causes the amplitude of the readback signal to flip (hence the terminology "amplitude flip"), which results in corrupt data.

Accordingly, what are needed are ways in which to improve the pinning field against flipping for self-pinned spin valves.

SUMMARY

A spin valve sensor of the self-pinned type includes one or more compressive stress modification layers for substantially reducing the likelihood that the pinning field will flip its direction. The spin valve sensor includes a capping layer formed over a spin valve structure which includes a free layer, an antiparallel (AP) self-pinned layer structure, and a spacer layer in between the free layer and the AP self-pinned layer structure. A compressive stress modification layer is formed above or below the capping layer, adjacent the AP self-pinned layer structure, or both. Preferably, the compressive stress modification layer is made of ruthenium (Ru) or other suitable material.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

A spin valve sensor of the self-pinned type includes one or more compressive stress modification layers for substantially reducing the likelihood that the pinning field will flip its direction. The spin valve sensor includes a capping layer formed over a spin valve structure which includes a free layer, an antiparallel (AP) self-pinned layer structure, and a spacer layer in between the free layer and the AP self-pinned layer structure. A compressive stress modification layer is formed above or below the capping layer, adjacent the AP self-pinned layer structure, or both. Preferably, the compressive stress modification layer is made of ruthenium (Ru) or other suitable material.

The following description is the best embodiment presently contemplated for carrying out the present invention. This description is made for the purpose of illustrating the general principles of the present invention and is not meant to limit the inventive concepts claimed herein.

Figure 1:
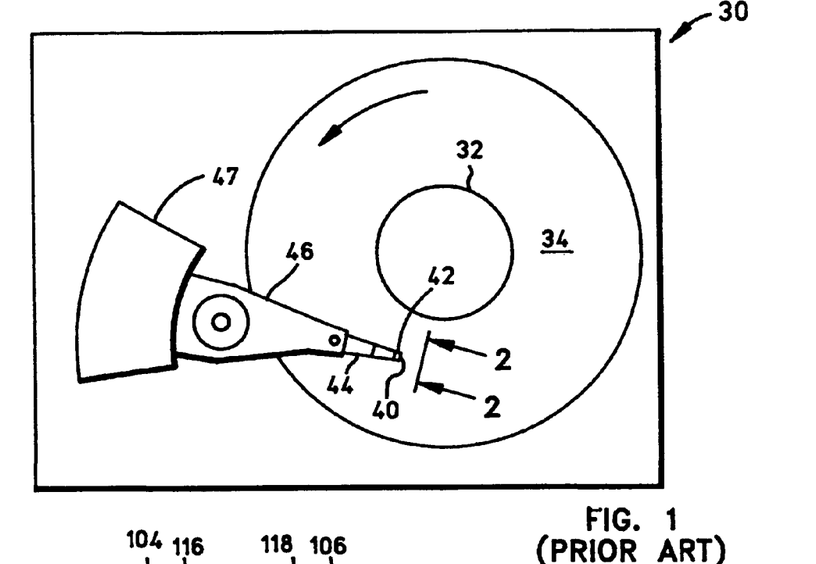
FIG. 1 is a plan view of an exemplary magnetic disk drive.
Figure 2:
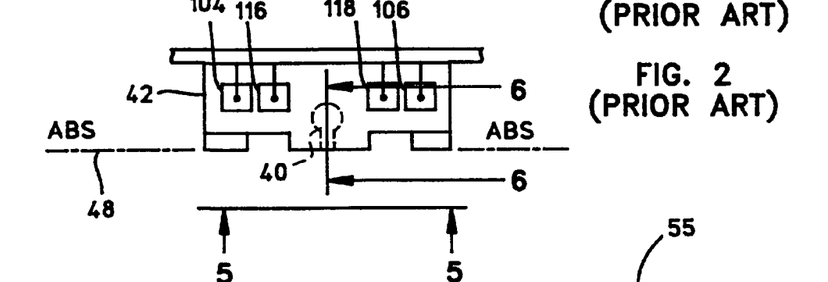
FIG. 2 is an end view of a slider with a magnetic head of the disk drive as seen in plane 2—2 of FIG. 1.
Figure 3:
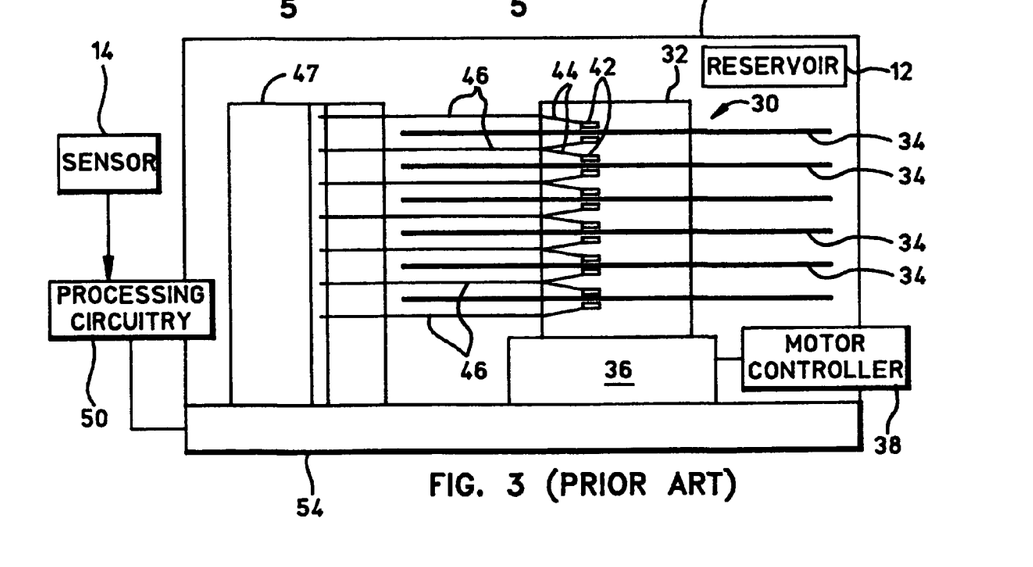
FIG. 3 is an elevation view of the magnetic disk drive wherein multiple disks and magnetic heads are employed.
Figure 4:
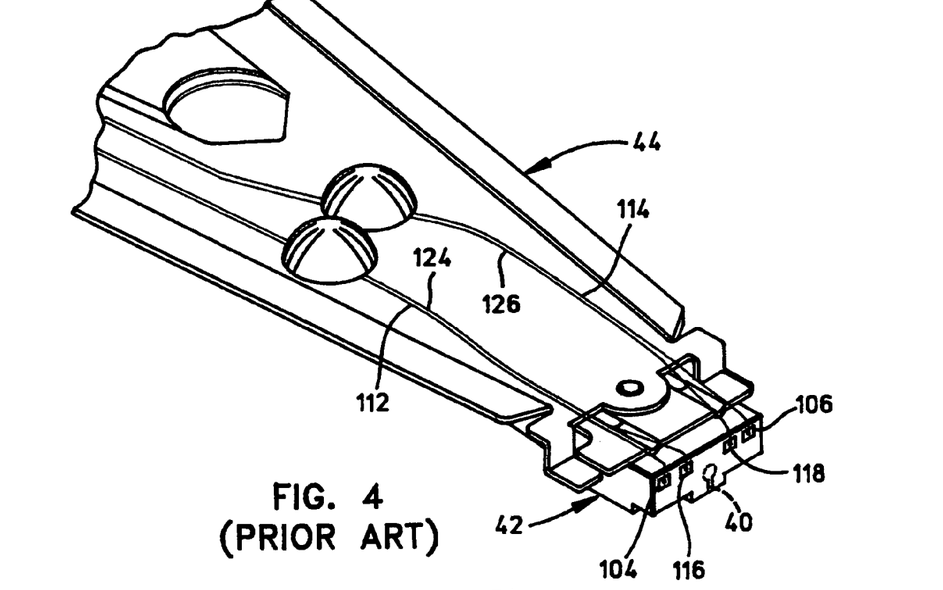
FIG. 4 is an isometric illustration of an exemplary suspension system for supporting the slider and magnetic head.
Figure 5:
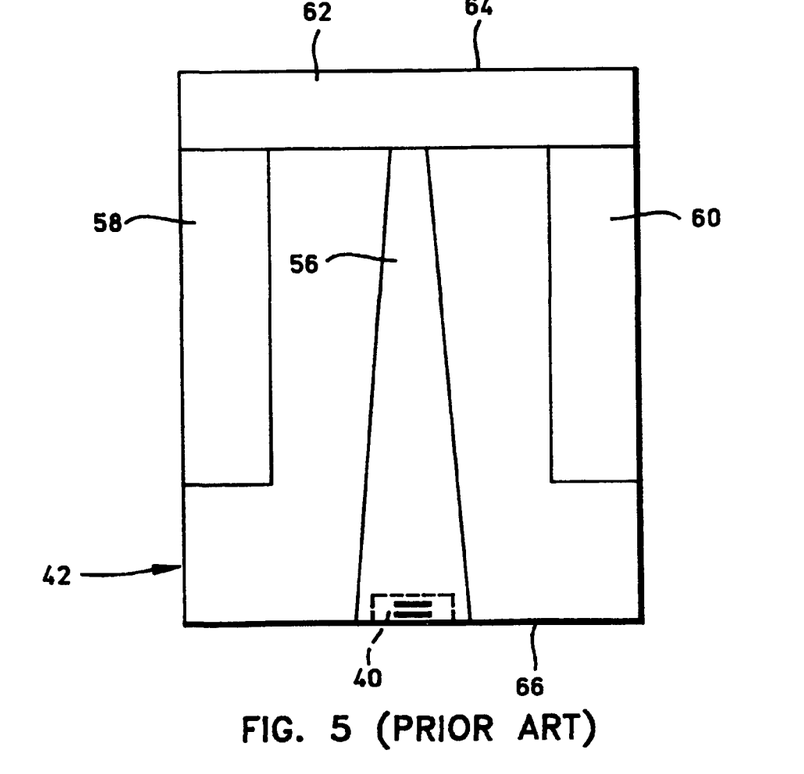
FIG. 5 is an ABS view of the magnetic head taken along plane 5—5 of FIG. 2.

Referring now to the drawings wherein like reference numerals designate like or similar parts throughout the several views, FIGS. 1–3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

Figure 6:
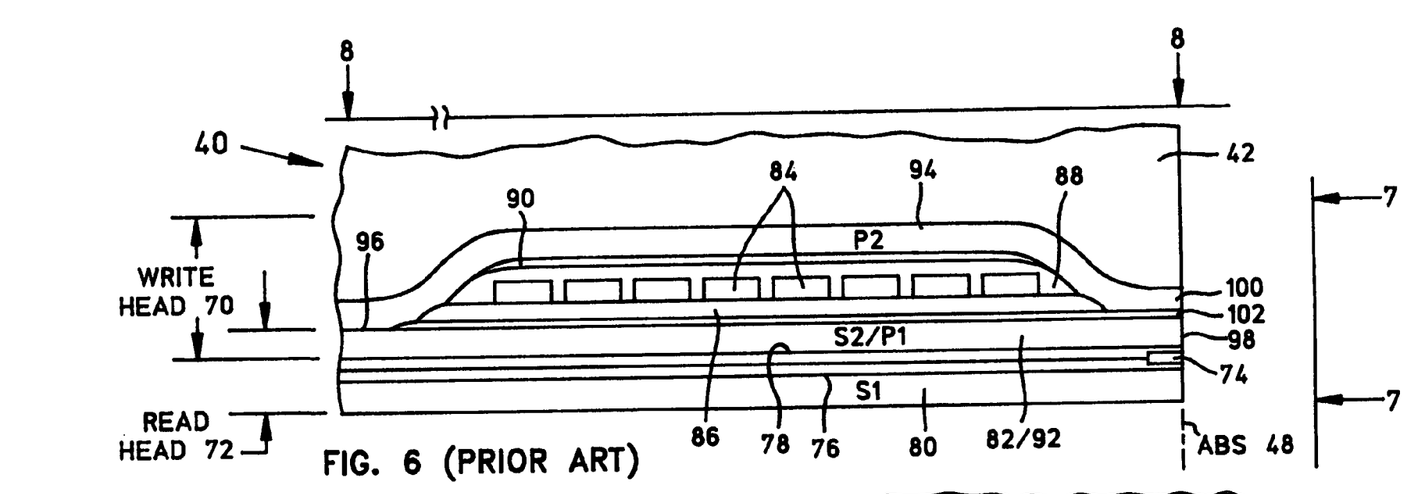
FIG. 6 is a partial view of the slider and a merged magnetic head as seen in plane 6—6 of FIG. 2.
Figure 7:
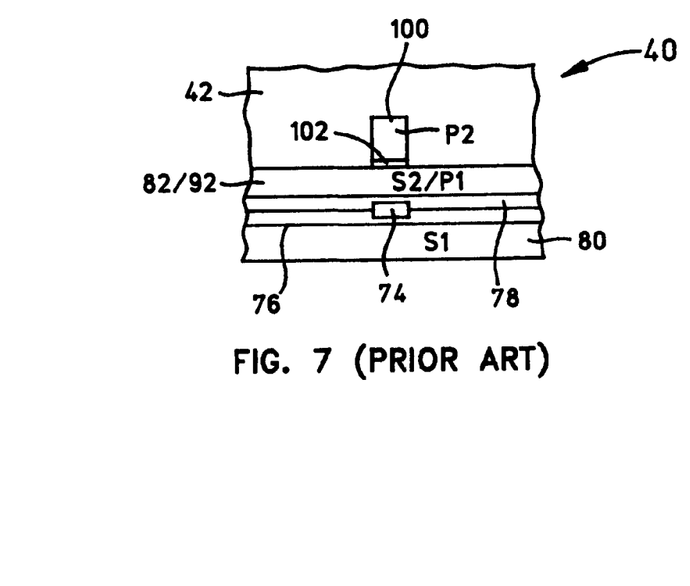
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72. Read head portion 72 includes a giant magnetoresistive (GMR) read head which utilizes a spin valve sensor 74 of the present invention. FIG. 7 is an ABS view of FIG. 6. Spin valve sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of spin valve sensor 74 changes. A sense current Is conducted through the sensor causes these resistance changes to be manifested as potential changes. These potential changes are then processed as readback signals by processing circuitry 50 shown in FIG. 3.

Figure 8:
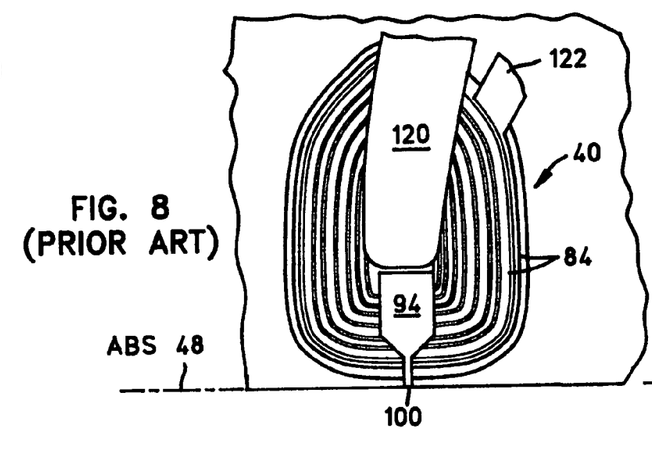
FIG. 8 is a view taken along plane 8—8 of FIG. 6 with all material above the coil layer and leads removed.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
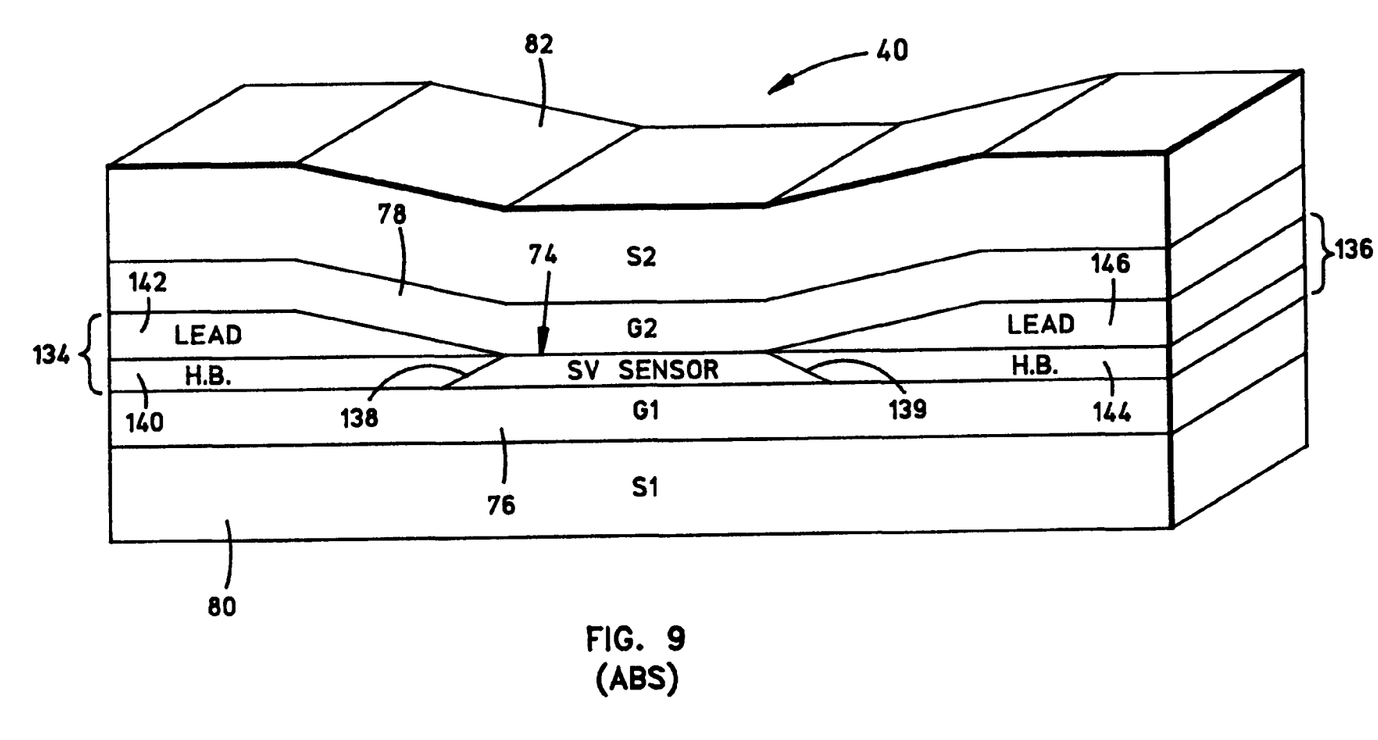
FIG. 9 is an enlarged isometric illustration of a read head having a spin valve sensor.

FIG. 9 is an enlarged isometric ABS illustration of read head 40 shown in FIG. 7 which includes spin valve sensor 74. First and second hard bias and lead layers 134 and 136 are connected to first and second side edges 138 and 139 of spin valve sensor 74. This connection is known in the art as a contiguous junction and is fully described in commonly assigned U.S. Pat. No. 5,018,037 which is incorporated by reference herein. First hard bias and lead layers 134 include a first hard bias layer 140 and a first lead layer 142, and second hard bias and lead layers 136 include a second hard bias layer 144 and a second lead layer 146. Hard bias layers 140 and 144 cause magnetic fields to extend longitudinally through spin valve sensor 74 for stabilizing the magnetic domains therein. Spin valve sensor 74 and first and second hard bias and lead layers 134 and 136 are located between the nonmagnetic electrically insulative first and second read gap layers 76 and 78. First and second read gap layers 76 and 78 are, in turn, located between ferromagnetic first and second shield layers 80 and 82.

Figure 10:
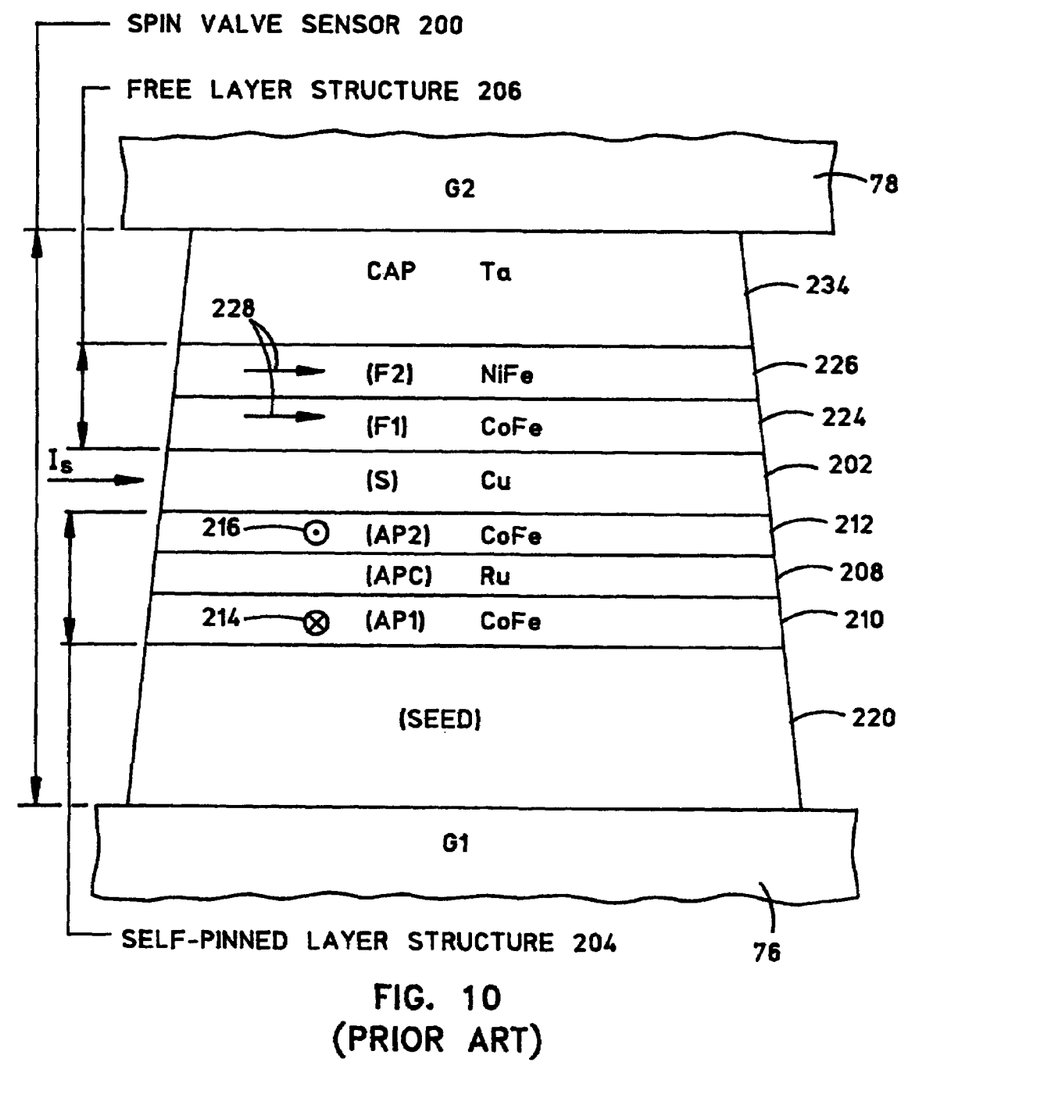
FIG. 10 is an ABS illustration of a typical multi-layer structure of a spin valve sensor of the self-pinned type.

FIG. 10 shows an ABS illustration of a typical multi-layered structure of a spin valve sensor 200 of the self-pinned type located between first and second read gap layers 76 and 78. Spin valve sensor 200 includes a non-magnetic electrically conductive spacer (S) layer 202 which is located between an antiparallel (AP) self-pinned layer structure 204 and a free layer 206. AP self-pinned layer structure 204 includes an antiparallel coupling (APC) layer 208 which is located between first and second ferromagnetic AP pinned layers (AP1) and (AP2) 210 and 212. A seed layer 220 is provided between first read gap layer 76 and pinning layer 214 for promoting a desirable texture of the layers deposited thereon. Free layer 206 includes first and second free ferromagnetic layers (F1) and (F2) 224 and 226, with first free layer 224 interfacing spacer layer 202. Free layer 224 has a magnetic moment 228 which is oriented parallel to the ABS and to the major planes of the layers in a direction from right to left, or from left to right, as shown in FIG. 10. A cap or capping layer 234 is formed over free layer 206 for protecting the sensor.

Note that no antiferromagnetic (AFM) pinning layer in FIG. 10 is necessary for pinning within spin valve sensor 200. In a non-self-pinned type application, first AP pinned layer 210 is exchange-coupled to an AFM pinning layer which pins a magnetic moment 214 of first AP pinned layer 210 perpendicular to the ABS in a direction out of or into spin valve sensor 200, as shown in FIG. 10. By strong antiparallel coupling between first and second AP pinned layers 210 and 212, a magnetic moment 216 of second AP pinned layer 212 is antiparallel to magnetic moment 214. A self-pinned spin valve sensor, however, relies on magnetostriction of AP self-pinned layer structure 204 as well as ABS stress for a self-pinning effect. An AFM pinning layer, which is typically as thick as 150 Angstroms, is not necessary for pinning and therefore a relatively thin sensor can be fabricated.

When a signal field from the rotating magnetic disk rotates magnetic moment 228 into the sensor, magnetic moments 228 and 216 become more antiparallel which increases the resistance of the sensor to the sense current (Is). When a signal field rotates magnetic moment 228 of free layer 206, magnetic moments 228 and 216 become more parallel which reduces the resistance of sensor 200 to the sense current (Is). These resistance changes are processed as playback signals by processing circuitry (i.e. processing circuitry 50 of FIG. 3).

The following materials may be utilized in the multilayered spin valve sensor 200 of FIG. 10. Seed layer 220 is a multi-layered seed layer structure which includes alumina ($Al_2O_3$), nickel-iron-chromium (NiFeCr), nickel-iron (NiFe), and platinum-manganese (PtMn), respectively, from bottom to top; AP pinned layers 210 and 212 of AP self-pinned layer structure 204 are made of cobalt-iron (CoFe); APC layer 208 is made of ruthenium (Ru); first and second free layers 224 and 226 are made of cobalt-iron (CoFe) and nickel-iron (NiFe), respectively; spacer layer 202 is made of copper (Cu); and capping layer 234 is made of tantalum (Ta). An additional copper (Cu) layer may be formed over second free layer 226 for reflecting conduction electrons back into the mean free path of conduction electrons.

Thicknesses of particular materials for spin valve sensor 200 may be 30 Angstroms of $Al_2O_3$ for the first (bottom) seed layer, 30 Angstroms of NiFeCr for the second seed layer, 10 Angstroms of NiFe for the third seed layer, and 30 Angstroms of PtMn for the fourth (top) seed layer; various thicknesses X of $Co_{90}Fe_{10}$ for first AP pinned layer 210; 8 Angstroms of Ru for APC layer 208; various thicknesses Z of $Co_{90}Fe_{10}$ for second AP pinned layer 212; 20 Angstroms of Cu for spacer layer 202; 15 Angstroms of $Co_{90}Fe_{10}$ for first free layer 224; 15 Angstroms of $Ni_{83}Fe_{17}$ for second free layer 226; and 40 Angstroms of Ta for capping layer 234. If sensor 200 were not a self-pinned type sensor, an AFM pinning layer of PtMn having a thickness of 150 Angstroms would need to be formed adjacent pinned layer structure 204 for pinning the magnetic moment 214 of first AP pinned layer 210. Note that the thickness of the fourth (top) seed layer of PtMn at 30 Angstroms is not sufficient to provide any pinning effect, which quickly decreases when the PtMn is at or below 75 Angstroms and is negligible at or below 50 Angstroms. Preferably, this fourth top seed layer of PtMn is between 5–75 Angstroms.

Utilizing a self-pinned structure in a spin valve sensor achieves higher bit densities with its thinner profile and increased sensitivity. One of the key challenges for self-pinned spin valves, however, has been to improve the pinning field against "flipping". Readback signals from the disk are detected as either a "0" or "1" depending on the polarity of the bits recorded on the disk. However, when an undesirable head-to-disk interaction occurs (due to asperities, bumps, defects, etc.), the sensor experiences compressive or tensile stress which causes the pinning field to flip its direction. The pinning field may flip its direction either permanently or semi-permanently depending on the severity of the stress. This causes the amplitude of the readback signal to flip, which results in corrupt data. According to the present invention, a spin valve sensor of the self-pinned type includes one or more compressive stress modification layers for substantially reducing the likelihood that the pinning field will flip its direction. Different embodiments of such sensors are shown and described in relation to FIGS. 11–13.

Figure 11:
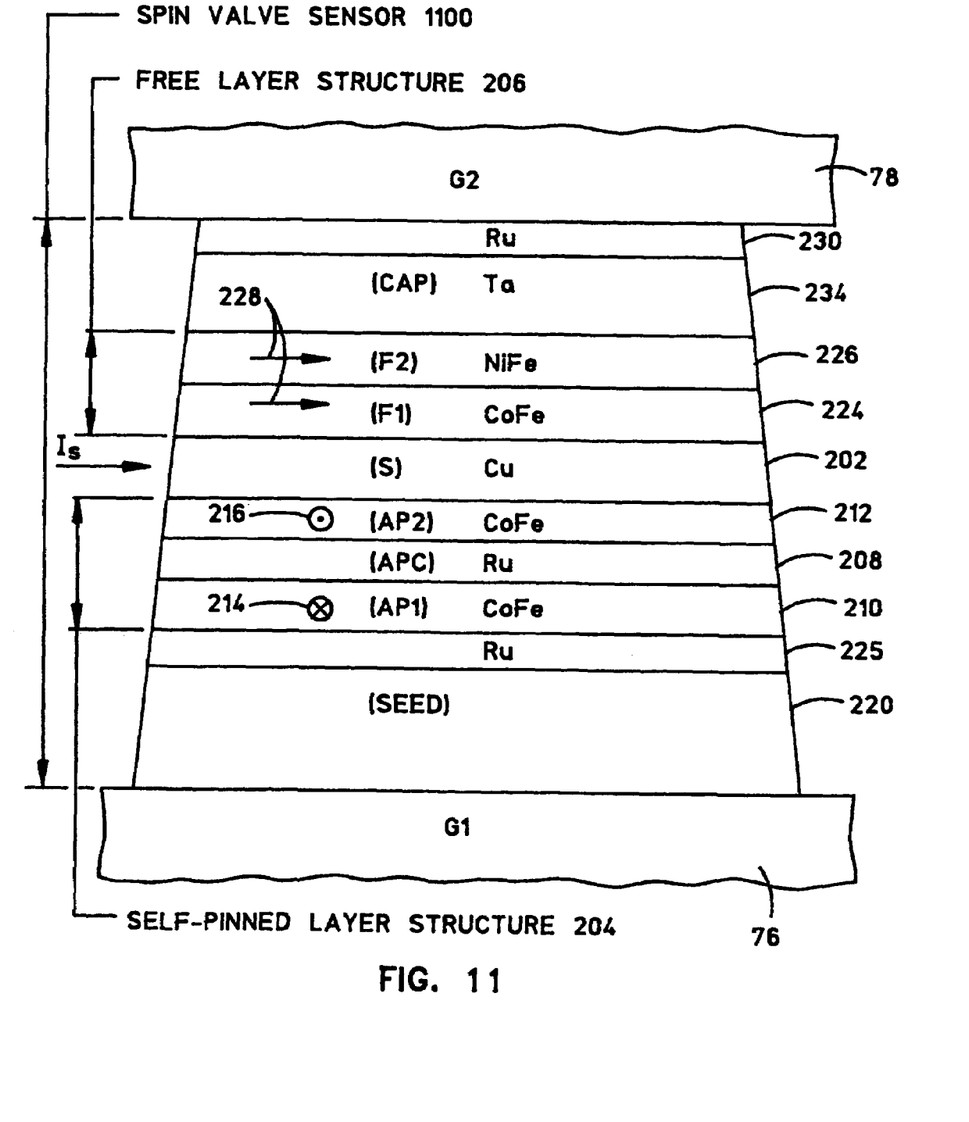
FIG. 11 is an ABS illustration of a first embodiment of a multi-layer structure of a spin valve sensor of the self-pinned type having compressive stress modification layers for reducing the likelihood that the pinning field will flip its direction.

FIG. 11 is an ABS illustration of a first embodiment of a multi-layer structure of a spin valve sensor 1200 of the self-pinned type with compressive stress modification layers for reducing the likelihood that the pinning field will flip its direction. Spin valve sensor 1100 of FIG. 11 is similar to the spin valve sensor of FIG. 10 except that it includes compressive stress modification layers 225 and 230.

Compressive stress modification layer 225 is formed adjacent AP self-pinned layer structure 204. More particularly, compressive stress modification layer 225 is formed directly between first AP pinned layer 210 and seed layer 220. The addition of compressive stress modification layer 225 modifies the intrinsic compressive stress within spin valve sensor 1100. Since the self-pinning effect is a result of negative anisotropy which is based on positive magnetostriction and compressive stress, any external compressive stresses have a diminished effect on the pinning field. Therefore, compressive stress modification layer 225 reduces the likelihood that the pinning field will flip its direction. Preferably, compressive stress modification layer 225 is formed of ruthenium (Ru). Although pure ruthenium may be utilized, other alternatives may be suitable such as a ruthenium alloy (e.g. ruthenium-copper) or rhodium (Rh) as examples. The ruthenium may be formed to a thickness of about 20 Angstroms. However, the thickness of the ruthenium may vary to between about 5–40 Angstroms, although between 15–20 Angstroms has been identified as being optimal in this embodiment. Note that the ruthenium cannot be formed too thick as it may lead to a shunting of current in the spin valve sensor.

Spin valve sensor 1100 of FIG. 11 utilizes another compressive stress modification layer in addition to compressive stress modification layer 225. Namely, spin valve sensor 1100 also includes a compressive stress modification layer 230 formed adjacent capping layer 234 near free layer structure 206. In this particular embodiment, compressive stress modification layer 230 is formed directly above and in contact with capping layer 234. The addition of compressive stress modification layer 230 also modifies the intrinsic compressive stress within spin valve sensor 1100. Similar to compressive stress modification layer 225, compressive stress modification layer 230 is formed of ruthenium (Ru). Although pure ruthenium may be utilized, other alternatives may be suitable such as a ruthenium alloy (e.g. ruthenium-copper) or rhodium (Rh) as examples. The ruthenium may be formed to a thickness of about 20 Angstroms. However, the thickness of the ruthenium may vary to between about 5–40 Angstroms. Note that the ruthenium cannot be formed too thick as it may lead to a shunting of current in spin valve sensor 1100.

Advantageously, with use of compressive stress modification layers 225 and 230 in spin valve sensor 1100, the magnetostriction of the pinned layers is increased (e.g. by a factor of two) while the magnetostriction for the free layer is maintained at near-zero. Thus, the compressive stress modification layers reduce the likelihood that the pinning field will flip its direction.

Figure 12:
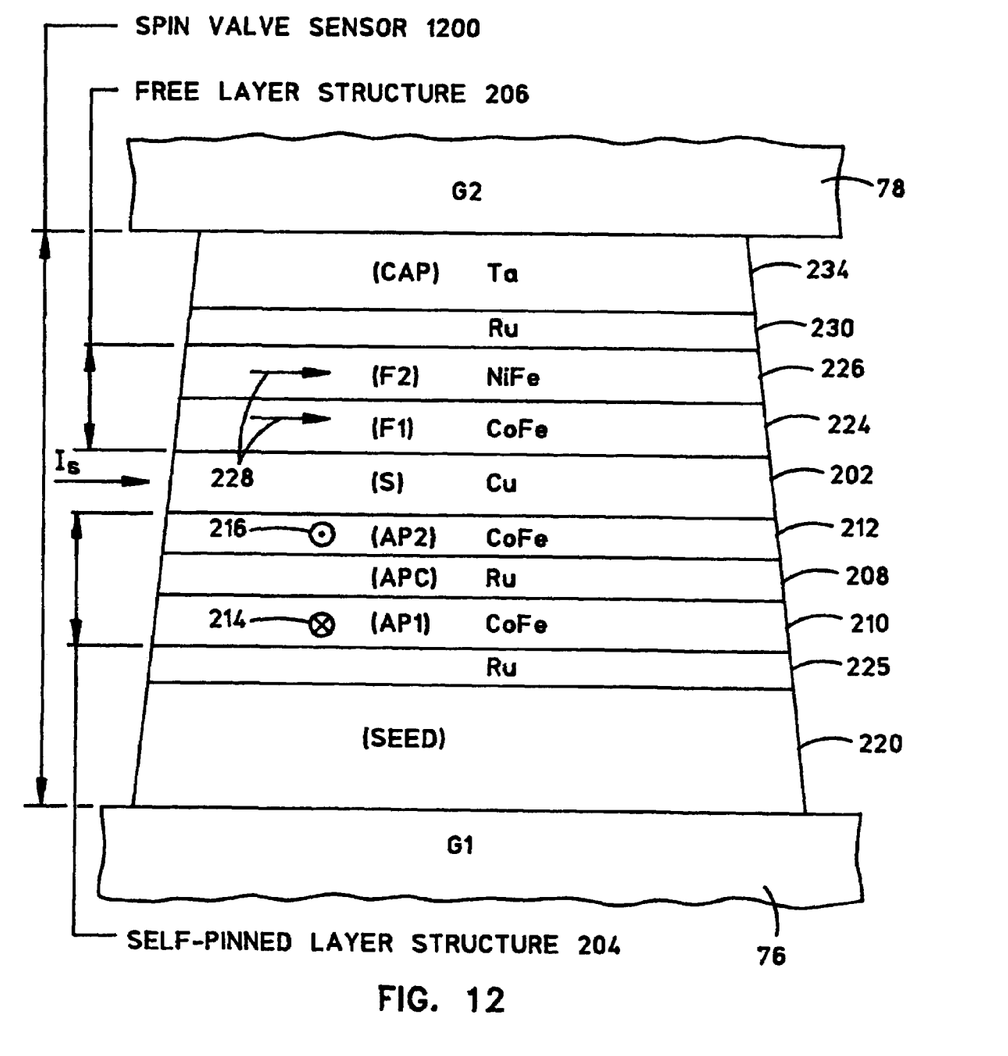
FIG. 12 is an ABS illustration of a second embodiment of a multi-layer structure of a spin valve sensor of the self-pinned type having compressive stress modification layers for reducing the likelihood that the pinning field will flip its direction.

FIG. 12 is an ABS illustration of a second embodiment of a multi-layer structure of a spin valve sensor 1200 of the self-pinned type with compressive stress modification layers for reducing the likelihood that the pinning field will flip its direction. Spin valve sensor 1200 is similar to the spin valve sensor of FIG. 11 except that compressive stress modification layer 230 of FIG. 12 is formed between capping layer 234 and free layer structure 206 instead of being formed on top of capping layer 234. As with compressive stress modification layer 230 of FIG. 11, compressive stress modification layer 230 of FIG. 12 modifies the intrinsic compressive stress within spin valve sensor 1200 and therefore reduces the likelihood that the pinning field will flip its direction. Although the structure of spin valve sensor 1200 of FIG. 12 may be well-suited for some applications, spin valve sensor 1100 of FIG. 11 is preferred over that of FIG. 12 since, in some GMR designs, the presence of ruthenium next to the free layer lowers the magnetoresistance.

Figure 13:
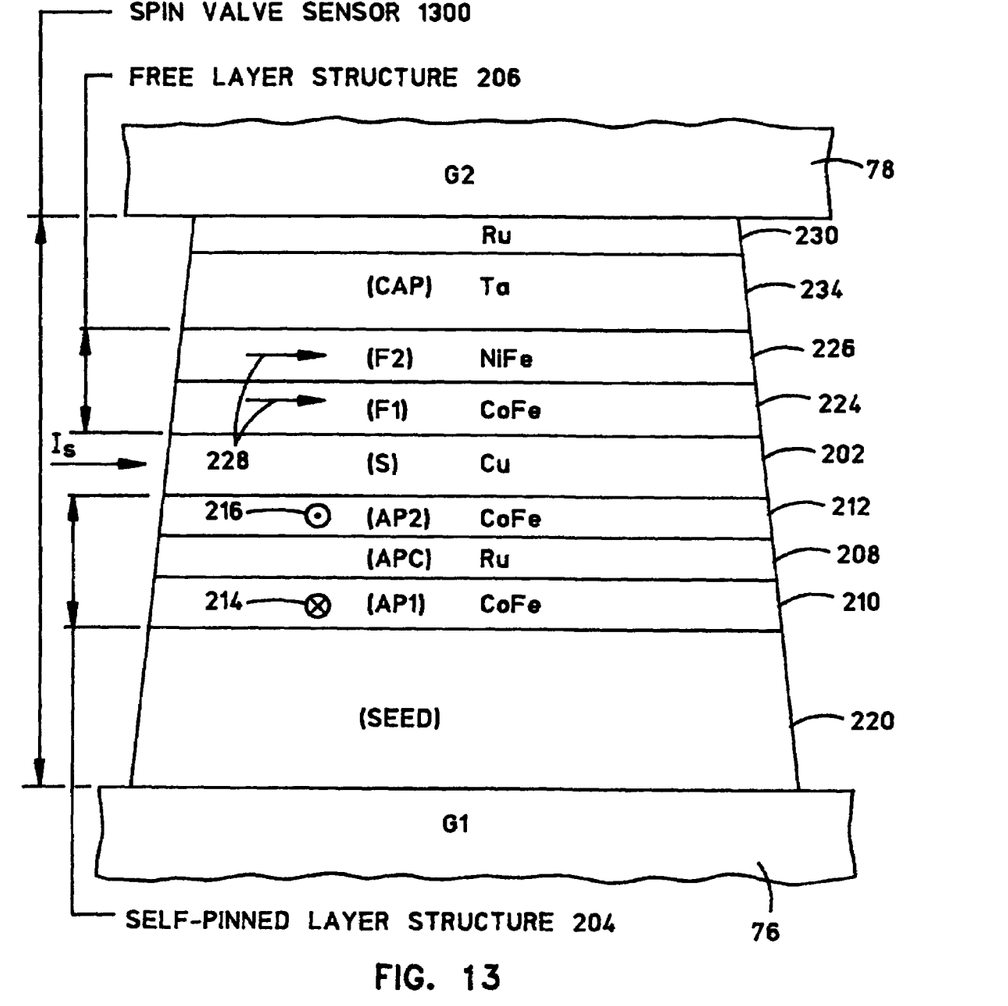
FIG. 13 is an ABS illustration of a third embodiment of a multi-layer structure of a spin valve sensor of the self-pinned type having a compressive stress modification layer for reducing the likelihood that the pinning field will flip its direction.

FIG. 13 is an ABS illustration of a third embodiment of a multi-layer structure of a spin valve sensor 1300 of the self-pinned type having a compressive stress modification layer for reducing the likelihood that the pinning field will flip its direction. Spin valve sensor 1300 is similar to the spin valve sensor of FIG. 11 except that compressive stress modification layer 225 of FIG. 11 is removed. Nevertheless, compressive stress modification layer 230 of FIG. 13 formed over capping layer 234 in itself modifies the intrinsic compressive stress within spin valve sensor 1300 and therefore reduces the likelihood that the pinning field will flip its direction.

It is to be understood that the above is merely a description of preferred embodiments of the invention and that various changes, alterations, and variations may be made without departing from the true spirit and scope of the invention as set for in the appended claims. Although the specific sensors described herein have been bottom-pinned type spin valves, one skilled in the art will understand that it is applicable to top-pinned type spin valves and others. Few if any of the terms or phrases in the specification and claims have been given any special meaning different from their plain language meaning, and therefore the specification is not to be used to define terms in an unduly narrow sense.

What is claimed is:

1. A spin valve sensor for a magnetic head, comprising:
   a free layer;
   an antiparallel (AP) self-pinned layer structure;
   the AP self-pinned layer structure including:
      a first AP pinned layer;
      a second AP pinned layer;
      an antiparallel coupling (APC) layer formed between the first and the second AP pinned layers;
   a non-magnetic electrically conductive spacer layer in between the free layer and the AP self-pinned layer structure;
   a seed layer; and
   a compressive stress modification layer formed between the AP self-pinned layer structure and the seed layer.

2. The spin valve sensor of claim 1, wherein the compressive stress modification layer increases a magnetostriction in the AP self-pinned layer structure to increase self-pinning.

3. The spin valve sensor of claim 1, wherein the compressive stress modification layer reduces the likelihood of amplitude flip in the spin valve sensor.

4. The spin valve sensor of claim 1, wherein the compressive stress modification layer comprises ruthenium (Ru).

5. The spin valve sensor of claim 1, wherein the AP self-pinned structure is pinned by magnetostriction and compressive stress.

6. The spin valve sensor of claim 1, wherein an antiferromagnetic (AFM) pinning layer is not necessary for pinning the AP self-pinned layer structure.

7. The spin valve sensor of claim 1, wherein the compressive stress modification layer comprises a ruthenium alloy.

8. The spin valve sensor of claim 1, wherein the compressive stress modification layer comprises a first compressive stress modification layer and the spin valve sensor further comprises:
   a capping layer; and
   a second compressive stress modification layer formed over the capping layer.

9. The spin valve sensor of claim 1, wherein the compressive stress modification layer comprises a first compressive stress modification layer and the spin valve sensor further comprises:
   a capping layer;
   a second compressive stress modification layer formed over the capping layer; and
   the second compressive stress modification layer comprising ruthenium (Ru).

10. The spin valve sensor of claim 1, wherein the compressive stress modification layer comprises a first compressive stress modification layer and the spin valve sensor further comprises:
    a capping layer;
    a second compressive stress modification layer formed over the capping layer; and wherein the second compressive stress modification layer reduces the likelihood of amplitude flip in the spin valve sensor.

11. The spin valve sensor of claim 1, wherein the compressive stress modification layer comprises a first compressive stress modification layer and the spin valve sensor further comprises:
a capping layer; and
a second compressive stress modification layer formed under the capping layer.

12. The spin valve sensor of claim 1, wherein the compressive stress modification layer comprises a first compressive stress modification layer and the spin valve sensor further comprises:
a capping layer;
a second compressive stress modification layer formed under the capping layer; and
the second compressive stress modification layer comprising ruthenium (Ru).

13. The spin valve sensor of claim 1, wherein the compressive stress modification layer comprises a first compressive stress modification layer and the spin valve sensor further comprises:
a capping layer;
a second compressive stress modification layer formed under the capping layer; and
wherein the second compressive stress modification layer reduces the likelihood of amplitude flip in the spin valve sensor.

14. A disk drive, comprising:
a housing;
a magnetic disk rotatably supported in the housing;
a magnetic head;
a support mounted in the housing for supporting the magnetic head so as to be in a transducing relationship with the magnetic disk;
a spindle motor for rotating the magnetic disk;
an actuator positioning means connected to the support for moving the magnetic head to multiple positions with respect to said magnetic disk;
a processor connected to the magnetic head assembly, to the spindle motor, and to the actuator for exchanging signals with the magnetic head for controlling movement of the magnetic disk and for controlling the position of the magnetic head;
the magnetic head assembly including a read head;
the read head including a spin valve sensor comprising:
a free layer;
an antiparallel (AP) self-pinned layer structure;
the AP self-pinned layer structure including:
a first AP pinned layer;
a second AP pinned layer;
an antiparallel coupling (APC) layer formed between the first and the second AP pinned layers;
a non-magnetic electrically conductive spacer layer in between the free layer and the AP self-pinned layer structure;
a seed layer; and
a compressive stress modification layer formed between the AP self-pinned layer structure and the seed layer.

15. The disk drive of claim 14, wherein the compressive stress modification layer increases a magnetostriction in the AP self-pinned layer structure to increase self-pinning.

16. The disk drive of claim 14, wherein the compressive stress modification layer reduces the likelihood of amplitude flip in the spin valve sensor.

17. The disk drive of claim 14, wherein the compressive stress modification layer comprises ruthenium (Ru).

18. The disk drive of claim 14, wherein the compressive stress modification layer comprises a first compressive stress modification layer and the spin valve sensor further comprises:
a capping layer; and
a second compressive stress modification layer formed over the capping layer.

19. The disk drive of claim 14, wherein the compressive stress modification layer comprises a first compressive stress modification layer and the spin valve sensor further comprises:
a capping layer;
a second compressive stress modification layer formed over the capping layer; and
the second compressive stress modification layer comprising ruthenium (Ru).

20. The disk drive of claim 14, wherein the compressive stress modification layer comprises a first compressive stress modification layer and the spin valve sensor further comprises:
a capping layer;
a second compressive stress modification layer formed over the capping layer; and
wherein the second compressive stress modification layer reduces the likelihood of amplitude flip in the spin valve sensor.

21. The disk drive of claim 14, wherein the compressive stress modification layer comprises a first compressive stress modification layer and the spin valve sensor further comprises:
a capping layer; and
a second compressive stress modification layer formed under the capping layer.

22. The disk drive of claim 14, wherein the compressive stress modification layer comprises a first compressive stress modification layer and the spin valve sensor further comprises:
a capping layer;
a second compressive stress modification layer formed under the capping layer; and
the second compressive stress modification layer comprising ruthenium (Ru).

23. The disk drive of claim 14, wherein the compressive stress modification layer comprises a first compressive stress modification layer and the spin valve sensor further comprises:
a capping layer;
a second compressive stress modification layer formed under the capping layer; and
wherein the second compressive stress modification layer reduces the likelihood of amplitude flip in the spin valve sensor.

24. A spin valve sensor for a magnetic head, comprising:
a spin valve structure which includes:
a free layer;
an antiparallel (AP) self-pinned layer structure;
a non-magnetic electrically conductive spacer layer in between the free layer and the AP self-pinned layer structure;
the AP self-pinned layer structure including:
a first AP pinned layer;
a second AP pinned layer;
an antiparallel coupling (APC) layer formed between the first and the second AP pinned layers;
a capping layer formed over the spin valve structure;

a seed layer formed under the AP self-pinned layer structure;

a first compressive stress modification layer formed over the capping layer; and a second compressive stress modification layer formed between the seed layer and the AP self-pinned layer structure.

25. The spin valve sensor of claim 24, wherein the first and the second compressive stress modification layers reduce the likelihood of amplitude flip in the spin valve sensor.

26. The spin valve sensor of claim 24, wherein the first and the second compressive stress modification layers comprise ruthenium (Ru).

27. The spin valve sensor of claim 24, wherein the first and the second compressive stress modification layers comprise:

ruthenium alloy.

28. A disk drive, comprising:

a housing;

a magnetic disk rotatably supported in the housing;

a magnetic head;

a support mounted in the housing for supporting the magnetic head so as to be in a transducing relationship with the magnetic disk;

a spindle motor for rotating the magnetic disk;

an actuator positioning means connected to the support for moving the magnetic head to multiple positions with respect to said magnetic disk;

a processor connected to the magnetic head assembly, to the spindle motor, and to the actuator for exchanging signals with the magnetic head for controlling movement of the magnetic disk and for controlling the position of the magnetic head;

the magnetic head assembly including a read head;

the read head including a spin valve sensor comprising:

a spin valve structure which includes:

a free layer;

an antiparallel (AP) self-pinned layer structure;

a non-magnetic electrically conductive spacer layer in between the free layer and the AP self-pinned layer structure;

the AP self-pinned layer structure including:

a first AP pinned layer;

a second AP pinned layer;

an antiparallel coupling (APC) layer formed between the first and the second AP pinned layers;

a capping layer formed over the spin valve structure; and a seed layer formed under the AP self-pinned layer structure;

a first compressive stress modification layer formed over the capping layer; and a second compressive stress modification layer formed between the seed layer and the AP self-pinned layer structure.

29. The disk drive of claim 28, wherein the first and the second compressive stress modification layers reduce the likelihood of amplitude flip in the spin valve sensor.

30. The disk drive of claim 28, wherein the first and the second compressive stress modification layers comprise ruthenium (Ru).

31. The disk drive of claim 28, wherein the first and the second compressive stress modification layers comprise a ruthenium alloy.

* * * * *